US012592963B2

(12) United States Patent
Nakano et al.

(10) Patent No.: US 12,592,963 B2
(45) Date of Patent: Mar. 31, 2026

(54) DETECTION DEVICE, DETECTION METHOD, AND DETECTION PROGRAM

(71) Applicant: NTT, Inc., Tokyo (JP)

(72) Inventors: Hiroki Nakano, Musashino (JP); Daiki Chiba, Musashino (JP)

(73) Assignee: NTT, Inc., Tokyo (JP)

( * ) Notice: Subject to any disclaimer, the term of this patent is extended or adjusted under 35 U.S.C. 154(b) by 309 days.

(21) Appl. No.: 18/031,616

(22) PCT Filed: Oct. 14, 2020

(86) PCT No.: PCT/JP2020/038731
§ 371 (c)(1),
(2) Date: Apr. 13, 2023

(87) PCT Pub. No.: WO2022/079822
PCT Pub. Date: Apr. 21, 2022

(65) Prior Publication Data
US 2023/0379359 A1 Nov. 23, 2023

(51) Int. Cl.
*H04L 9/40* (2022.01)
(52) U.S. Cl.
CPC ................................ *H04L 63/1483* (2013.01)
(58) Field of Classification Search
CPC ... H04L 63/1483; G06F 21/51; G06F 21/554; G06F 21/56; G06F 16/9566
See application file for complete search history.

(56) References Cited

U.S. PATENT DOCUMENTS 9,083,729 B1 7/2015 Doshi et al.
9,298,824 B1 * 3/2016 Vinnik .................... H04L 63/14
(Continued)

FOREIGN PATENT DOCUMENTS

CN 109472027 A 3/2019
CN 110427754 A * 11/2019 ........... G06F 21/552
CN 107341268 B * 6/2020 ......... G06F 16/9535

OTHER PUBLICATIONS

Invernizzi, et al., "EVILSEED: A Guided Approach to Finding MaliciousWeb Pages", Available Online At: https://sites.cs.ucsb.edu/~vigna/publications/2012_SP_Evilseed.pdf, Retrieved from the net on: Jul. 27, 2020, 15 pages.
(Continued)

*Primary Examiner* — Carl G Colin
(74) *Attorney, Agent, or Firm* — XSENSUS LLP

(57) ABSTRACT

A detection device includes processing circuitry configured to acquire user generated content generated in each service in a predetermined period, generate a search query using words appearing in the user generated content for each service, collect the user generated content generated in a plurality of services using the generated search query, calculate a feature amount of the collected user generated content of a predetermined service, perform learning using the feature amount of the user generated content generated by a normal user and a feature amount of content generated by a malicious user, determine whether the user generated content is generated by a malicious user based on a learned model, and access an entrance URL described in the user generated content and output a feature of an attack of the user generated content as threat information when the user generated content is determined to be generated by a malicious user.

6 Claims, 18 Drawing Sheets

(56) References Cited

U.S. PATENT DOCUMENTS

| | | | | |
|---|---|---|---|---|
| 10,078,750 | B1 * | 9/2018 | Oliver | G06F 21/552 |
| 10,104,113 | B1 * | 10/2018 | Stein | H04L 63/1425 |
| 10,896,473 | B2 * | 1/2021 | Hüffner | G06Q 50/01 |
| 11,868,722 | B1 * | 1/2024 | Tully | G06F 40/284 |
| 2010/0095375 | A1 * | 4/2010 | Krishnamurthy | H04L 63/1433 |
| | | | | 707/E17.108 |
| 2013/0124644 | A1 * | 5/2013 | Hunt | G06Q 50/01 |
| | | | | 709/206 |
| 2013/0179421 | A1 | 7/2013 | Jeong et al. | |
| 2019/0014148 | A1 * | 1/2019 | Foster | H04L 63/0209 |
| 2019/0356681 | A1 * | 11/2019 | Sandke | H04L 63/1425 |
| 2020/0234109 | A1 | 7/2020 | Lee et al. | |
| 2021/0312041 | A1 * | 10/2021 | Gururajan | G06F 21/554 |

OTHER PUBLICATIONS

Gao et al., "Towards Online Spam Filtering in Social Networks", Available Online At: http://cucis.ece.northwestern.edu/publications/pdf/GaoChe12.pdf, Retrieved from the net on: Jul. 27, 2020, 16 pages.

Lee et al., "WARNINGBIRD: Detecting Suspicious URLs in Twitter Stream", Available Online At: https://www.ndss-symposium.org/wp-content/uploads/2017/09/11_1.pdf, Retrieved from the net on: Jul. 27, 2020, 13 pages.

Rafique et al., "It's Free for a Reason: Exploring the Ecosystem of Free Live Streaming Services", NDSS '16, Available Online At: https://www.ndss-symposium.org/wp-content/uploads/2017/09/free-reason-exploring-ecosystemfree-live-streaming-services.pdf, Feb. 21-24, 2016, pp. 1-15.

* cited by examiner

COLLECT 1000 QUERIES/h
IN OTHER SERVICES

SERVICE a

SERVICE b

SERVICE c

SEARCH QUERY

Free Stream Rugby iPhone Giveaways

Live Streaming Soccer

KEY PHRASES ARE
EXTRACTED

ANALYSIS

MALICIOUS USER
GENERATION CONTENT

Free Live Click Here
http://evil.test

TWEET WITH URL IS
COLLECTED AT
1,500,000/h.

SERVICE

Free Live Click Here
http://streaming.test

USER GENERATION
CONTENT

Fig. 4

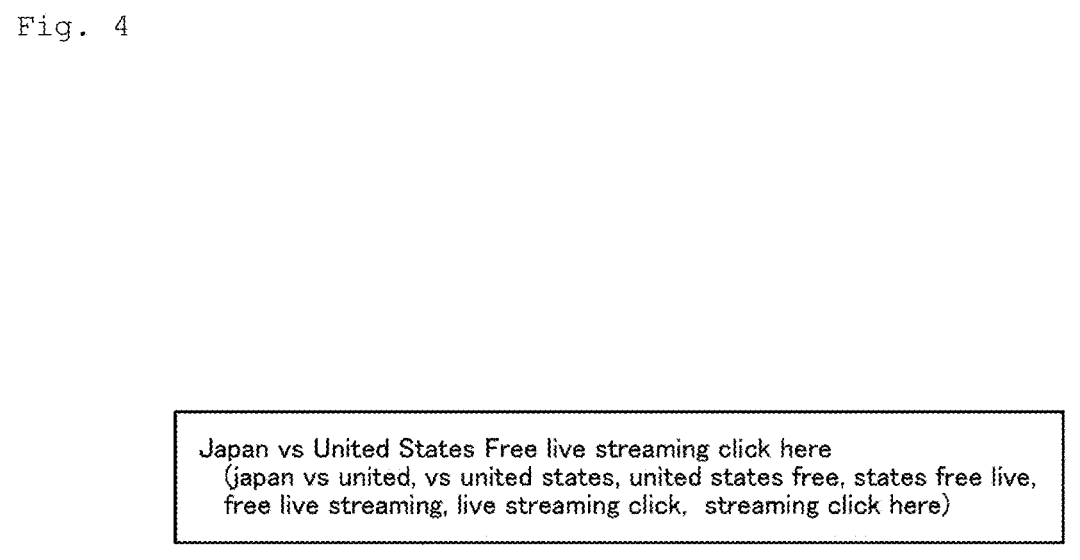

Japan vs United States Free live streaming click here
(japan vs united, vs united states, united states free, states free live,
free live streaming, live streaming click,  streaming click here)

Fig. 7

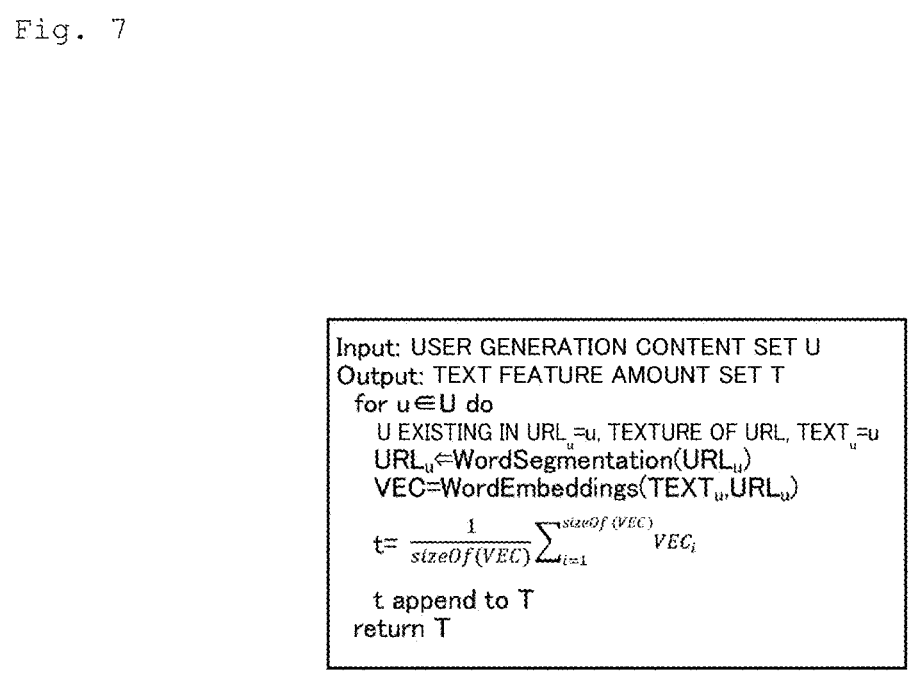

Input: USER GENERATION CONTENT SET U
Output: TEXT FEATURE AMOUNT SET T
  for $u \in U$ do
    U EXISTING IN $URL_u$=u, TEXTURE OF URL, $TEXT_u$=u
    $URL_u \Leftarrow$ WordSegmentation($URL_u$)
    VEC=WordEmbeddings($TEXT_u$,$URL_u$)

$t = \dfrac{1}{sizeOf(VEC)} \sum_{i=1}^{sizeOf(VEC)} VEC_i$ t append to T
  return T

Fig. 8

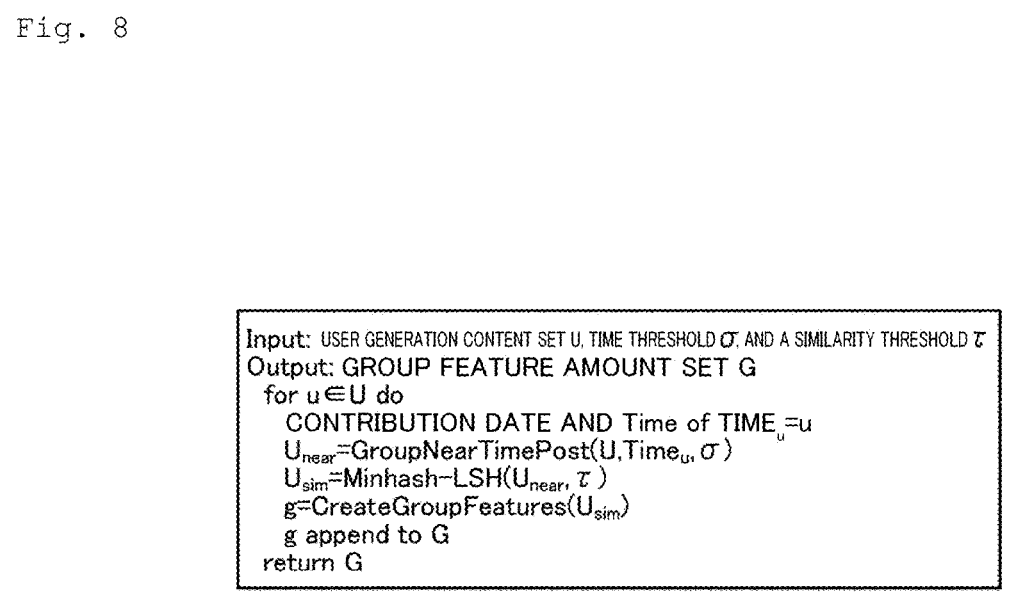

Input: USER GENERATION CONTENT SET U, TIME THRESHOLD $\sigma$, AND A SIMILARITY THRESHOLD $\tau$
Output: GROUP FEATURE AMOUNT SET G
  for $u \in U$ do
    CONTRIBUTION DATE AND Time of $TIME_u = u$
    $U_{near} = GroupNearTimePost(U, Time_u, \sigma)$
    $U_{sim} = Minhash\text{-}LSH(U_{near}, \tau)$
    $g = CreateGroupFeatures(U_{sim})$
    g append to G
  return G

Fig. 9

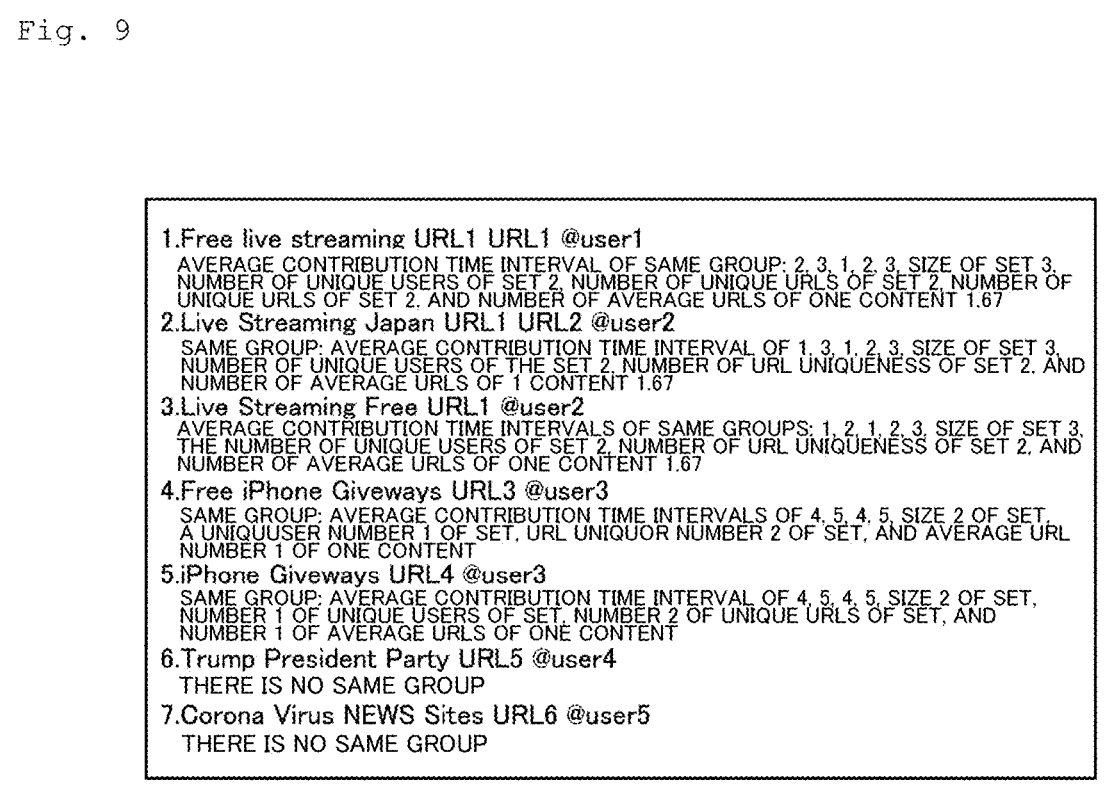

1.Free live streaming URL1 URL1 @user1
  AVERAGE CONTRIBUTION TIME INTERVAL OF SAME GROUP: 2, 3, 1, 2, 3, SIZE OF SET 3, NUMBER OF UNIQUE USERS OF SET 2, NUMBER OF UNIQUE URLS OF SET 2, NUMBER OF UNIQUE URLS OF SET 2, AND NUMBER OF AVERAGE URLS OF ONE CONTENT 1.67

2.Live Streaming Japan URL1 URL2 @user2
  SAME GROUP: AVERAGE CONTRIBUTION TIME INTERVAL OF 1, 3, 1, 2, 3, SIZE OF SET 3, NUMBER OF UNIQUE USERS OF THE SET 2, NUMBER OF URL UNIQUENESS OF SET 2, AND NUMBER OF AVERAGE URLS OF 1 CONTENT 1.67

3.Live Streaming Free URL1 @user2
  AVERAGE CONTRIBUTION TIME INTERVALS OF SAME GROUPS: 1, 2, 1, 2, 3, SIZE OF SET 3, THE NUMBER OF UNIQUE USERS OF SET 2, NUMBER OF URL UNIQUENESS OF SET 2, AND NUMBER OF AVERAGE URLS OF ONE CONTENT 1.67

4.Free iPhone Giveways URL3 @user3
  SAME GROUP: AVERAGE CONTRIBUTION TIME INTERVALS OF 4, 5, 4, 5, SIZE 2 OF SET, A UNIQUUSER NUMBER 1 OF SET, URL UNIQUOR NUMBER 2 OF SET, AND AVERAGE URL NUMBER 1 OF ONE CONTENT 5.iPhone Giveways URL4 @user3
  SAME GROUP: AVERAGE CONTRIBUTION TIME INTERVAL OF 4, 5, 4, 5, SIZE 2 OF SET, NUMBER 1 OF UNIQUE USERS OF SET, NUMBER 2 OF UNIQUE URLS OF SET, AND NUMBER 1 OF AVERAGE URLS OF ONE CONTENT 6.Trump President Party URL5 @user4
  THERE IS NO SAME GROUP 7.Corona Virus NEWS Sites URL6 @user5
  THERE IS NO SAME GROUP

Fig. 11

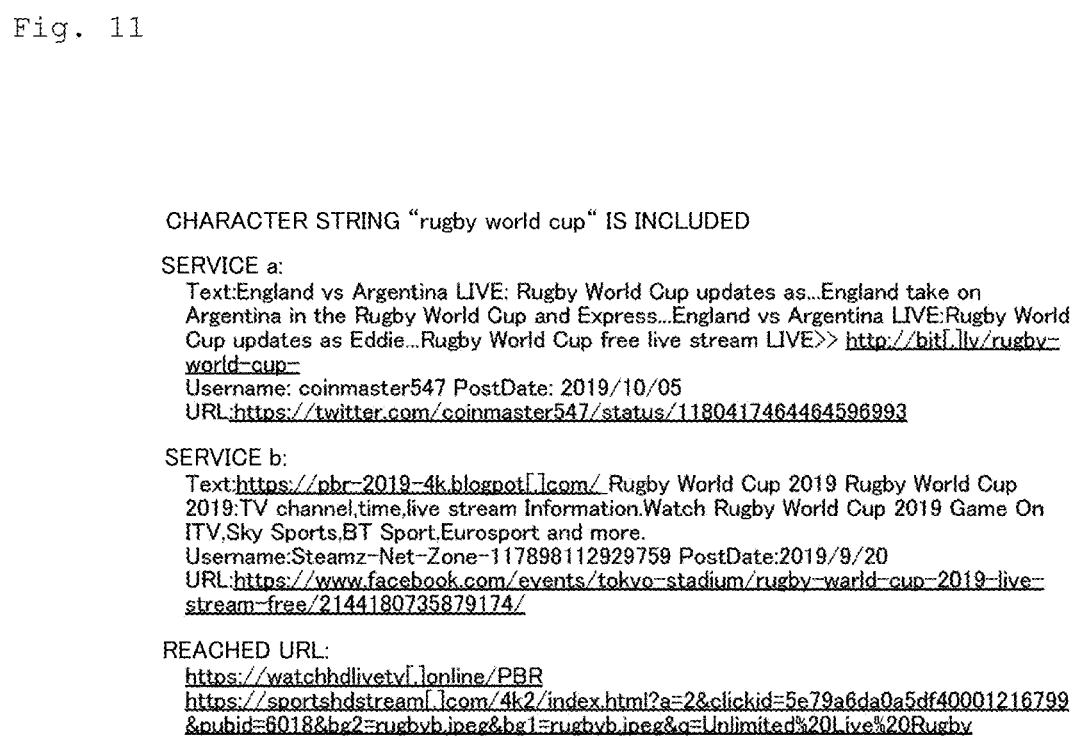

CHARACTER STRING "rugby world cup" IS INCLUDED

SERVICE a:
Text:England vs Argentina LIVE: Rugby World Cup updates as...England take on
Argentina in the Rugby World Cup and Express...England vs Argentina LIVE:Rugby World
Cup updates as Eddie...Rugby World Cup free live stream LIVE>> http://bit.ly/rugby-
world-cup-
Username: coinmaster547 PostDate: 2019/10/05
URL:https://twitter.com/coinmaster547/status/1180417464464596993

SERVICE b:
Text:https://pbr-2019-4k.blogpot.com/ Rugby World Cup 2019 Rugby World Cup
2019:TV channel,time,live stream Information.Watch Rugby World Cup 2019 Game On
ITV,Sky Sports,BT Sport,Eurosport and more.
Username:Steamz-Net-Zone-117898112929759 PostDate:2019/9/20
URL:https://www.facebook.com/events/tokyo-stadium/rugby-warld-cup-2019-live-
stream-free/2144180735879174/

REACHED URL:
https://watchhdlivetv.online/PBR
https://sportshdstream.com/4k2/index.html?a=2&clickid=5e79a6da0a5df40001216799
&pubid=6018&bg2=rugbyb.jpeg&bg1=rugbyb.jpeg&g=Unlimited%20Live%20Rugby

DETECTION DEVICE, DETECTION METHOD, AND DETECTION PROGRAM

CROSS-REFERENCE TO RELATED APPLICATION

The present application is based on PCT filing PCT/JP2020/038731, filed Oct. 14, 2020, the entire contents of which are incorporated herein by reference.

TECHNICAL FIELD

The present invention relates to a detection device, a detection method, and a detection program.

BACKGROUND ART

A social engineering (SE) attack which abuses the vulnerability of a user's mind is becoming the mainstream as a threat on the Web. As paths leading to malicious Web sites, user generated content such as moving images, blogs, and writing on bulletin board posts generated by an attacker through an online service and posted on the Web is increasing.

On the other hand, generated content of an attacker is intensively generated in a large amount in real time with an event such as a specific concert or sporting event as a target, and spread by providing it to regular users on a large number of services. Therefore, a detection technique having high detection accuracy, a high detection speed, and a wide detection range is anticipated.

For example, in the related art, a search engine is used to detect a malicious site and recursively create a query for searching for the malicious site (see NPL 1). Also (see NPL 2). Also (see NPL 3). Further, a technique for analyzing Web content of malicious sites is disclosed (see NPL 4).

CITATION LIST

Non Patent Literature

[NPL 1] Luca Invernizzi, Paolo Milani Comparetti, "EVIL-SEED: AGuided Approach to Finding Malicious Web Pages," [online], [retrieved Jul. 27, 2020], Internet <URL: https://sites.cs.ucsb.edu/~vigna/publications/2012_SP_Evilseed.pdf>
[NPL 2] Hongyu Gao, et al., "Towards Online Spam Filtering in Social Networks," [online] [retrieved Jul. 27, 2019], Internet <URL: http://cucis.ece.northwestern.edu/publications/pdf/GaoChe12.pdf>
[NPL 3] Sangho Lee, Jong Kim, "WARNINGBIRD: Detecting Suspicious URLs in Twitter Stream," [online], [retrieved Jul. 27, 2020], Internet <URL: ndss-symposium.org/wp-content/uploads/2017/09/11_1.pdf>
[NPL 4] M. Zubair Rafique, et al., "It's Free for aReason: Exploring the Ecosystem of Free Live Streaming Services," [online], [retrieved Jul. 27, 2020], Internet <URL: ndss-symposium.org/wp-content/uploads/2017/09/free-reason-exploring-ecosystem-free-live-streaming-services.pdf>

SUMMARY OF INVENTION

Technical Problem

However, the related art was insufficient in terms of detection accuracy, detection speed, and detection range. For example, the technique described in NPL 1 has a problem that it is necessary to access a malicious site and the detection speed is slow. In addition, in the technique described in NPL 2, in order to capture various attacks, design of a feature amount for detection is not appropriate, and the detection accuracy and the detection range were insufficient. Further, in the technique described in NPL 3, since a feature amount based on the assumption that all URLs are accessed is used, the detection speed is insufficient and the detection accuracy is also insufficient. Further, the technique described in NPL 4 is a technique using a specialized feature amount for false live stream site fraud, and therefore there is a problem that a detection range is limited.

The present invention has been devised in view of the foregoing circumstances and an object of the present invention is to rapidly perform detection of malicious sites over a wide area.

Solution to Problem

In order to solve the above-mentioned problem and to achieve the purpose, a presentation device according to the present invention includes: processing circuitry configured to: acquire user generated content generated in each service in a predetermined period; generate a search query using words appearing in the user generated content for each service; collect the user generated content generated in a plurality of services using the generated search query; calculate a feature amount of the collected user generated content of a predetermined service; perform learning using the feature amount of the user generated content generated by a normal user and a feature amount of content generated by a malicious user; determine whether the user generated content is generated by a malicious user based on a learned model; and access an entrance URL described in the user generated content and output a feature of an attack of the user generated content as threat information when the user generated content is determined to be generated by a malicious user.

Advantageous Effects of Invention

According to the present invention, it is possible to perform detection with high detection accuracy, high detection speed, and a wide detection range.

BRIEF DESCRIPTION OF DRAWINGS

FIG. 4 is a diagram for describing processing of a generation unit.

FIG. 7 is a diagram for explaining processing by the calculation unit.

FIG. 8 is a diagram for explaining processing by the calculation unit.

FIG. 9 is a diagram for explaining processing by the calculation unit.

FIG. 11 is a diagram for explaining threat information.

DESCRIPTION OF EMBODIMENTS

Hereinafter, an embodiment of the present invention will be described in detail with reference to the drawings. The present invention is not limited to the present embodiment. Further, in the description of the drawings, the same parts are denoted by the same reference signs.

Figure 1:
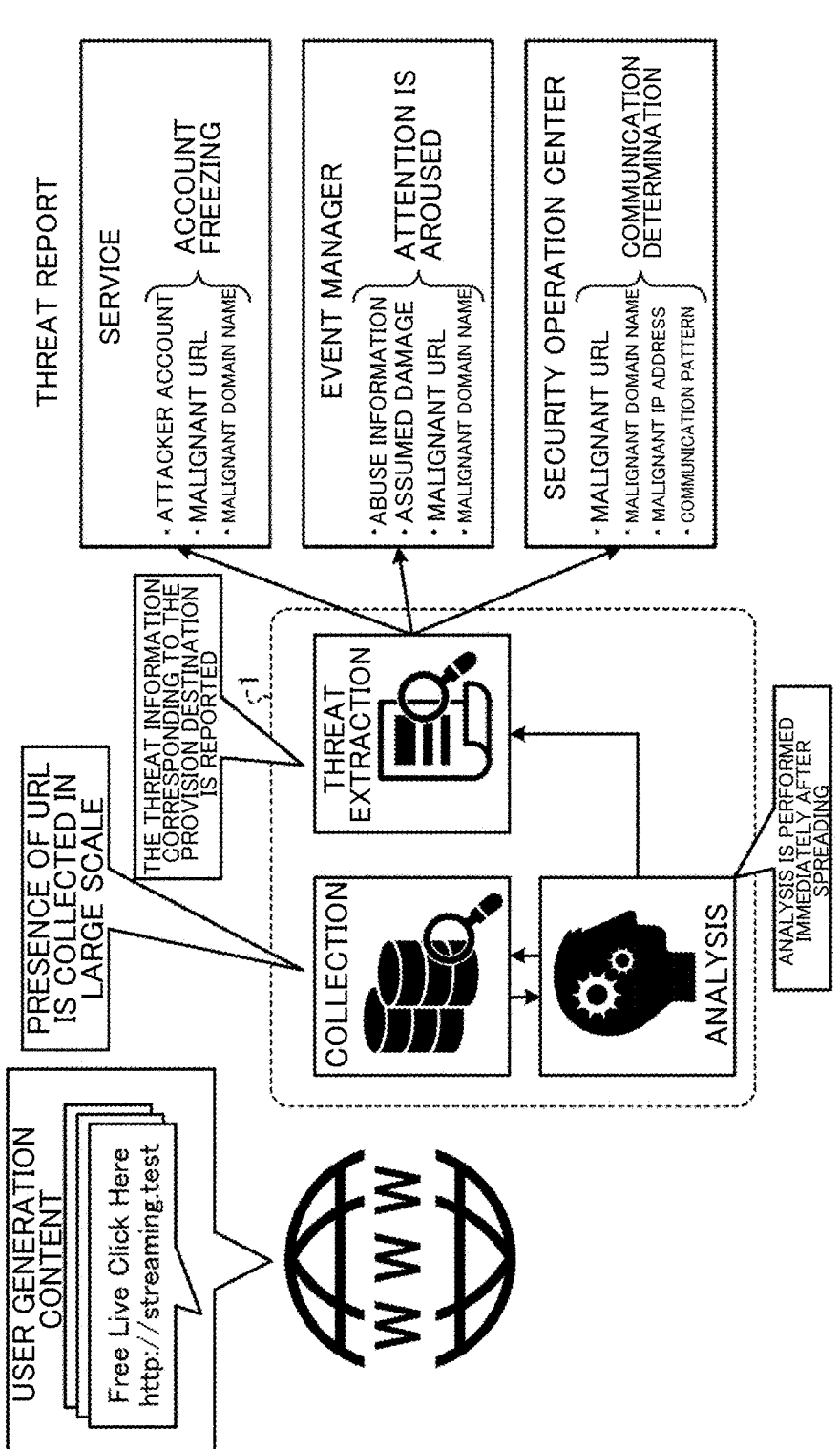
FIG. 1 is a diagram for describing an outline of a detection device according to this embodiment.

[Outline of Detection Device] FIG. 1 is a diagram for explaining an outline of a detection device. A detection device 1 according to the present embodiment collects user generated content such as moving images, blogs, and bulletin board posts generated by users and posted on the Web in online services such as Facebook (registered trademark) and Twitter (registered trademark), and performs analysis.

Specifically, attention is focused on an attacker intensively generating and spreading a large amount of user generated content for an event to which users pay attention, and generating the user generated content in a similar context such that the user wants to access a malicious site.

Then, the detection device 1 efficiently collects user generation contents having a high possibility of being malignant, generated by the attacker, using a feature that the user generation contents generated by the attacker are spread in a similar context at a specific timing, and analyzes whether it is malignant. When it is determined that the content is malicious user generation content as a result of the analysis, the detection device 1 extracts, from the malicious user generation content, threat information which is a feature that may become a threat, and outputs a threat report.

For example, the detection device 1 extracts similar contexts of user generated content to generate a search query, and efficiently collects user generated content having a high possibility of being malicious using the search query. In addition, by learning a feature difference specialized for a specific service between user generated content generated by an attacker and user generated content generated by a normal user, the maliciousness determination of a large amount of user generated content of the specific service generated at the same time is performed.

The detection device 1 learns a feature difference of Web content obtained by accessing a URL described in user generated content about the user generated content generated by the attacker and the user generated content generated by the regular user in an arbitrary service. Then, the detection device 1 performs maliciousness determination on user generated content generated in large amounts in an arbitrary service at the same time using the learned feature difference.

When it is determined that the content is malicious user generated content, the detection device 1 extracts threat information that is a feature that can be a threat from the malicious user generated content, and outputs a threat report. In this way, the detection device 1 detects an attack that may become a threat in real time.

Figure 2:
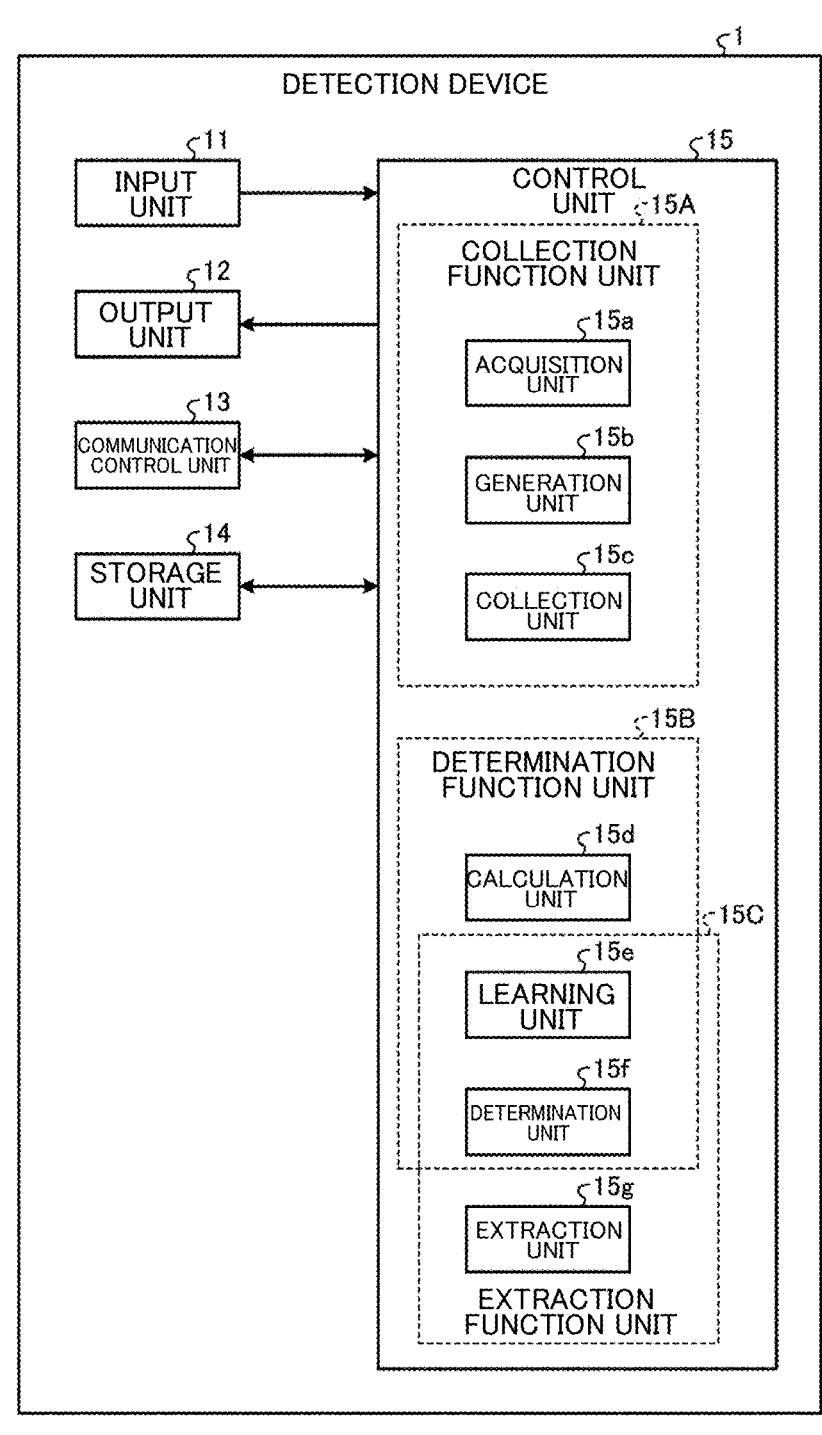
FIG. 2 is a schematic diagram for describing an example of an overall configuration of the detection device according to this embodiment.

[Configuration of Detection Device] FIG. 2 is a schematic diagram for describing an example of an overall configuration of the detection device according to this embodiment. As shown in FIG. 2, the detection device 1 of this embodiment is configured to include a collection function unit 15A, a determination function unit 15B, and an extraction function unit 15C. Each of these functional units may be mounted on hardware different from that of the detection device 1. That is, the detection device 1 may be implemented as a detection system having a collection device, a determination device, and an extraction device.

The detection device 1 is realized as a general-purpose computer such as a PC, and includes an input unit 11, an output unit 12, a communication control unit 13, a storage unit 14, and a control unit 15.

The input unit 11 is implemented, using an input device such as a keyboard or a mouse, and inputs various pieces of instruction information, such as start of processing, to the control unit 15 in response to an input operation by an operator. The output unit 12 is implemented by a display device such as a liquid crystal display or a printing device such as a printer. For example, the output unit 12 displays the result of the detection process described later.

The communication control unit 13 is implemented by, for example, a Network Interface Card (NIC), and controls electric communication between the control unit 15 and an external device via a telecommunication line such as a Local Area Network (LAN) or the Internet. For example, the communication control unit 13 controls communication between a server which manages user generation content for each service, etc. and the control unit 15.

The storage unit 14 is implemented by a semiconductor memory device such as a Random Access Memory (RAM) or a flash memory, or a storage device such as a hard disc or an optical disc. A processing program for operating the detection device 1, data used during execution of the processing program, and the like are stored in advance in the storage unit 14 or are stored temporarily each time the processing is performed. Note that the storage unit 14 may also be configured to communicate with the control unit 15 via the communication control unit 13.

In the embodiment, the storage unit 14 14 stores threat information and the like obtained as a result of the detection process to be described later. Further, the storage unit 14 may store user generated content acquired from a server or the like of each service by an acquisition unit 15a to be described later prior to the detection processing.

Returning to explanation of FIG. 2. The control unit 15 is realized using a central processing unit (CPU) or the like, and executes a processing program stored in a memory. As a result, the control unit 15 functions as the collection function unit 15A, the determination function unit 15B, and an extraction function unit 15C, as shown in FIG. 2.

The collection function unit 15A includes an acquisition unit 15a, a generation unit 15b, and a collection unit 15c. The determination function unit 15B includes a calculation unit 15d, a learning unit 15e, and a determination unit 15f. The extraction function unit 15C includes an extraction unit 15g, a learning unit 15e, and a determination unit 15f.

Note that each or some of these function units may be mounted on a different piece of hardware. For example, as described above, the collection function unit 15A, the determination function unit 15B, and the extraction function unit 15C may be mounted on different hardware as a collection device, a determination device, and an extraction device, respectively. Also, the control unit 15 may include another function unit.

Figure 3:
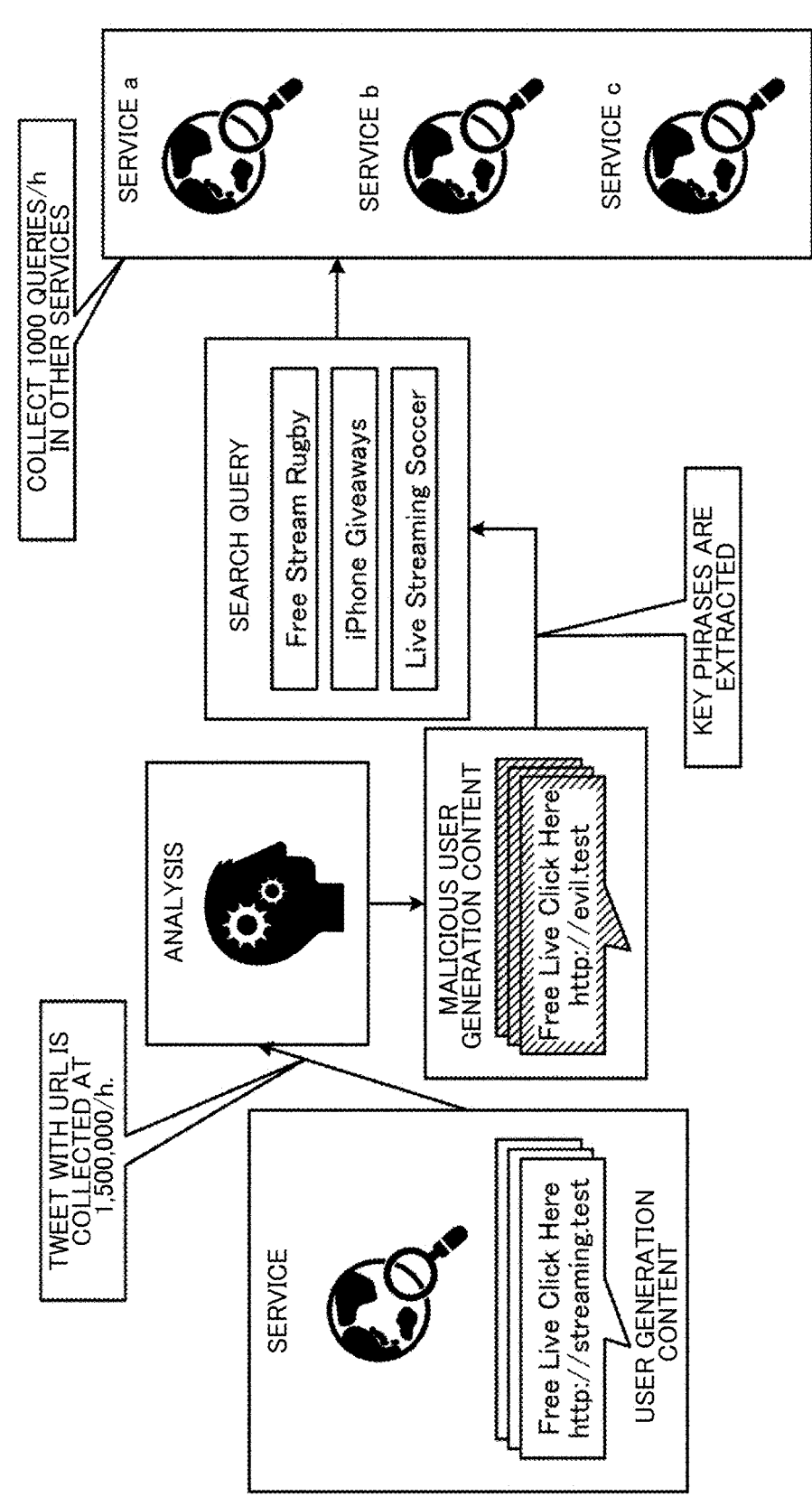
FIG. 3 is a diagram for describing processing of a collection function unit.

[Collection Function Unit] FIG. 3 is a diagram showing processing of the collection function unit. As shown in FIG. 3, the collection function unit 15A extracts similar context as a key phrase from a user generated content group generated at the same time by a certain service, and generates a retrieval query. The collection function unit 15A efficiently collects user generated content of an arbitrary service having a high possibility of being malicious using the generated retrieval query of the key phrase having a high possibility of being malicious.

The description of FIG. 2 is now resumed. An acquisition unit 15a acquires user generated content generated in each service in a predetermined period. Specifically, the acquisition unit 15a acquires user generated content from a server or the like of each service via an input unit 11 or a communication control unit 13.

For example, the acquisition unit 15a acquires user generated content in which a URL is described for a predetermined service. At this time, the acquisition unit 15a may acquire the user generated content periodically at predetermined time intervals or by designating the posting time using "since" or "until." Also, the acquisition unit 15a may acquire the user generated content only in which the URL is described using "filters." Thus, the acquisition unit 15a can acquire the user generated content in which the URL of the external site is described in real time.

The acquisition unit 15a may store the acquired user generated content in the storage unit 14, for example, prior to processing of the generation unit 15b to be described later.

The generation unit 15b generates a retrieval query using words appearing in user generated content for each service. For example, the generation unit 15b generates a retrieval query using a combination of appearing words.

Specifically, the generation unit 15b converts the acquired user generated content into a feature vector of a predetermined number of dimensions. For example, the generation unit 15b sets a vector of a distributed expression of words representing a combination of words appearing in each piece of user content as a feature vector of the user generated content in a vector space representing a vocabulary appearing in the user generated content, that is, all appearing words. Then, the generation unit 15b learns a model of the distributed expression of words in advance and applies a sentence summarization technique. That is, in the sentence summarization technique, a combination of words with a distributed expression similar to the distributed expression of the entire target sentence (text) is extracted as a key phrase.

Thus, the generation unit 15b extracts a key phrase representing the context of each piece of user generated content. The generation unit 15b generates a retrieval query for retrieving user generated content including the extracted key phrase.

Specifically, the generation unit 15b calculates the degree of similarity between the entire text of the user generated content and the key phrase candidate according to the following Formula (1). Here, doc is the entire target sentence, C is a key phrase candidate, and K is a set of extracted word combinations (phrases).

[Math. 1]

$$KeyPhraseScore := \qquad\qquad\qquad (1)$$

$$\arg_{C_i \epsilon C/K}^{max} \left[ \lambda \cdot \cos_{sim}(C_i, doc) - (1 - \lambda)_{C_j \epsilon K}^{max} \cos_{sim}(C_i, C_j) \right]$$

By changing $\lambda$ in the above Formula (1), it is possible to extract various key phrases.

For example, the generation unit 15b extracts a combination of words by an n-gram method for extracting n consecutive words from the text. Then, the generation unit 15b calculates cosine similarity between the whole text of the user generated content and each phrase of the extracted n-gram by the Formula (1), and extracts the maximum phrase among phrases whose calculated similarity value is higher than a predetermined threshold as a key phrase.

Here, FIG. 4 is a diagram for describing processing performed by the generation unit 15b. In an example shown in FIG. 4, the generation unit 15b extracts a combination of words by a 3-gram. Also, the generation unit 15b extracts key phrases by calculating the cosine similarity between entire text of user generation content "Japan vs United States Free live streaming click here" and each 3-gram phrase "Japan vs united", "vs united states", "united states free", . . . .

Alternatively, the generation unit 15b generates the retrieval query, using the appearance frequency of each word. For example, the generation unit 15b totalizes frequencies of appearance of a phrase of 2-gram and a phrase of 3-gram in a text of user generation content acquired in a predetermined period. Then, the generation unit 15b extracts a phrase whose appearance frequency is equal to or more than a predetermined threshold as a key phrase, and generates a retrieval query for retrieving user generation contents including the key phrase.

For example, the generation unit 15b extracts a phrase of a 3-gram from the text of all user generation contents posted every hour in 24 hours of March 1, and calculates the appearance frequency of each phrase. Next, the generation unit 15b extracts a statistically abnormal value (outlier) among the 3-gram phrases that appeared in the user generation content for 1 hour from 0:00 to 1:00 on March 2, the next day, as a key phrase. That is, the generation unit 15b sets the phrase as a key phrase when a large amount of user generation contents including phrases which do not appear normally are posted at specific timing.

For example, the generation unit 15b calculates a positive outlier value, using z-score. In the example shown in FIG. 4, for the phrase "japan vs united", it is assumed that the number of appearances per hour for 24 hours on March 1 is 0, 0, 0, 2, 4, 10, 2, 5, 10, 2, 4, 5, 6, 2, 2, 5, 12, 20, 15, 20, 10, 20, 25, 30, respectively. In this case, the average is 8.792 times and the standard deviation is 8.602.

It is also assumed that this phrase appears 50 times in 1 hour from 0:00 to 1:00 on March 2. The z-score in this case is calculated as $Z=(50-8.792)/8.602=4.790$. Further, when the threshold value of the outlier is 1.96 corresponding to the significant appearance frequency of 5%, the generation unit 15b uses this phrase "japan vs united" as a key phrase, and generates a search query to search for user generation content that includes this key phrase.

The generation unit 15b selects a retrieval query which may become malignant for each service. For example, the generation unit 15b calculates the degree of malignancy of the generated retrieval query on the basis of the retrieval query used for the retrieval of the user generation content determined to be malignant most recently for each service.

Then, the generation unit 15b selects a retrieval query whose malignancy is equal to or more than a predetermined threshold as a retrieval query of the service.

Here, the generation unit 15b calculates the percentage of the number of user generation content determined to be malignant, using the number of user generation content searched using this search query and determined to be malignant or benign in the past 24 hours, as the degree of malignancy of the search query. The generation unit 15b calculates an average value of the degree of malignancy of each word of the key phrase by regarding it as the degree of malignancy of the detection query.

For example, it is assumed that, in the service in the past 24 hours, the number of malicious user generation contents searched by the search query of the key phrase "rugby world cup streaming" is 20, and the number of benign user generation contents is 50. Also, it is assumed that the number of malicious user generation contents retrieved by the retrieval query of the key phrase "free live streaming" is 100, and the number of benign user generation contents is 100. Further, it is assumed that the number of malicious user generation contents retrieved by the retrieval query of the key phrase "Rugby japan vs korea" is 10, and the number of benign user generation contents is 100.

In this case, the degree of malignancy of the word "japan" is $\alpha=10/(10+100)$. The degree of malignancy of the word "rugby" is $\beta=\{20/(20+50)+10/(10+100)\}/2$. In addition, the degree of malignancy of the word "streaming" is $\gamma=\{20/(20+50)+100/(100+100)\}/2$.

Therefore, the score of the degree of malignancy of the search query of the key phrase "Japan rugby streaming" is calculated as $(\alpha+\beta+\gamma)/3=0.225$.

In this way, the generation unit 15b calculates the degree of malignancy of the retrieval query for each service, and selects the retrieval query whose calculated malignancy is equal to or more than a threshold as the retrieval query of the user generation content which may become the degree of malignancy of the service.

The collection unit 15c collects user generation contents generated in the plurality of services, using the generated retrieval query. For example, the collection unit 15c collects user generation contents of other services, using a retrieval query generated by the user generation contents of a certain service. Also, the collection unit 15c also collects a plurality of types of user generation content in each service together with the generated date and time using the same search query.

For example, the collection unit 15c applies the same search query to three types of collection URLs for the service a in which user generation content for text posting, video posting, and event notification is generated, and collects each of the three types of user generation content along with the date and time when it was posted (generated). The same search query is applied to a common collection URL to a service b in which user generation contents of moving image contribution and moving image distribution are generated, and two kinds of user generation contents are collected together with the date and time of contribution.

Thus, the collection unit 15c can efficiently collect the user generation contents spread in the similar context at the specific timing. Especially, the collection unit 15c can easily and quickly collect user generation contents having high possibility of being malignant for each service, using the retrieval query which can be malignant selected by the generation unit 15b.

The collection unit 15c collects the user generation contents by providing an upper limit to the collection amount, for example, such as 100 queries per hour. Thus, the load of the server of each service being the collection destination can be reduced.

Figure 5:
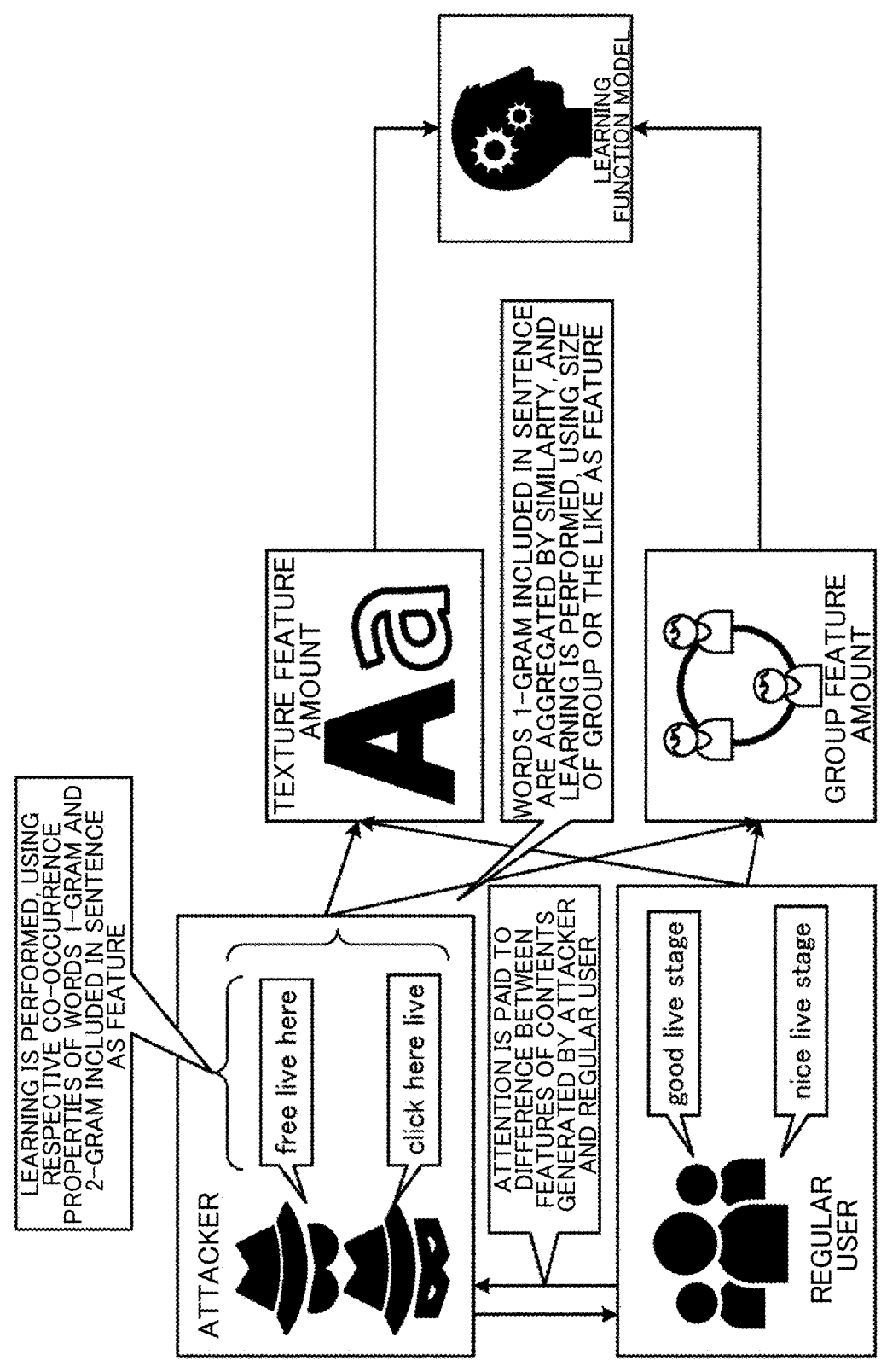
FIG. 5 is a diagram for describing processing of a determination function unit.

[Determination Function Unit] FIG. 5 is a diagram for describing processing of a determination function unit. As shown in FIG. 5, a determination function unit 15B acquires a machine learning model representing each feature amount by learning, using a difference in features between user generation contents generated by an attacker and user generation contents generated by a normal user for a specific service. The determination function unit 15B learns a machine learning model, using a text feature amount representing co-occurrence of phrases of the user generation content and a group feature amount representing similarity of words appearing in each user generation content as feature amounts.

Thus, the determination function unit 15B can determine whether the user generation content of the service generated thereafter is malignant, using the learned machine learning model. For example, the determination function unit 15B can determine the degree of malignancy of a large amount of user generation contents of a specific service generated at the same time in real time.

The description of FIG. 2 is now resumed. The calculation unit 15d calculates a feature amount of user generation content generated by a user in a predetermined service in a predetermined period. In the present embodiment, the feature amount of the user generation content is a text feature amount representing a feature of a combination of words co-occurring in a plurality of user generation contents, and a group feature amount representing a feature related to similarity of words between the plurality of user generation contents generated in a predetermined period.

Here, FIGS. 6 to 9 are each a diagram for explaining processing performed by the calculation unit. First, the calculation unit 15d calculates a text feature amount representing a feature of a combination of words co-occurring in a plurality of user generation contents. Specifically, the calculation unit 15d calculates the text feature amount of the set of user generation contents, using the model of the distributed expression of optimized words for each of phrases co-occurring in the set of collected user generation contents.

Figure 6:
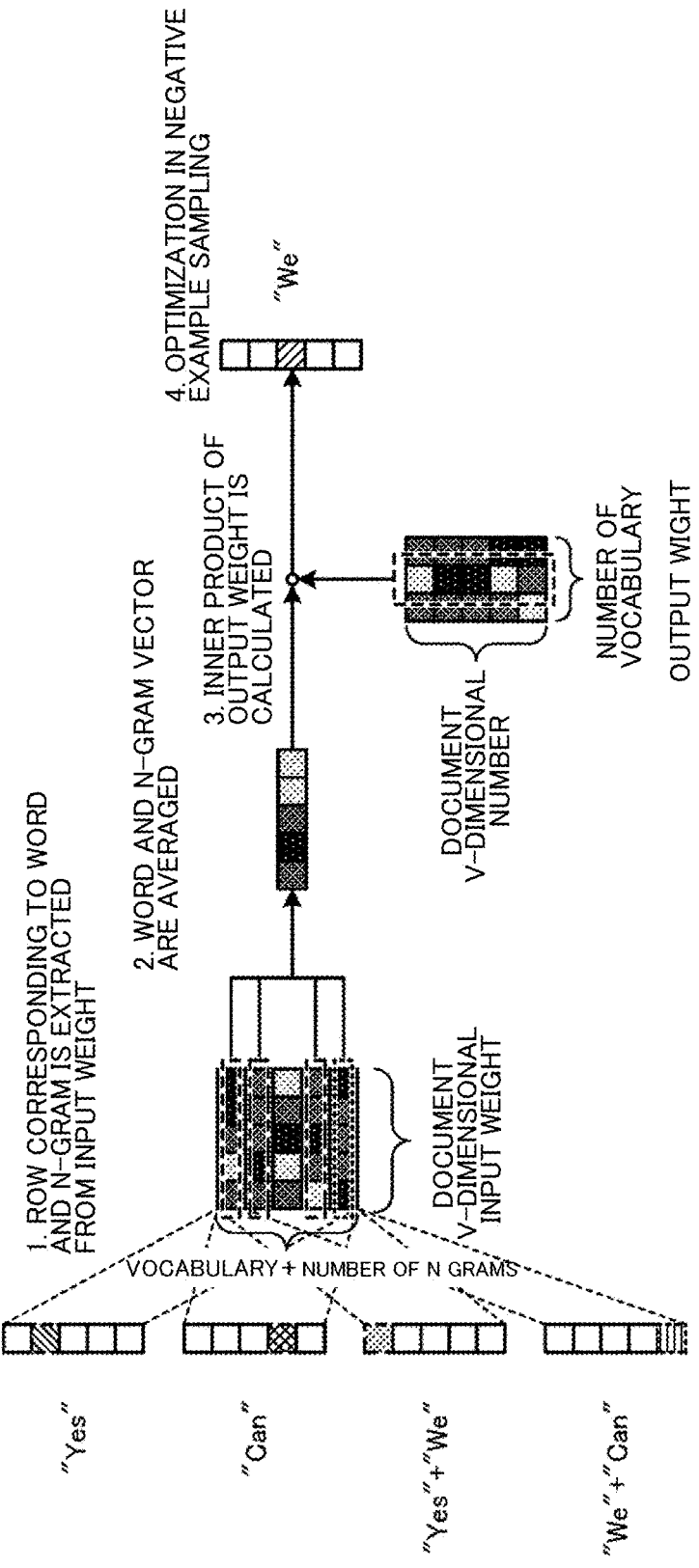
FIG. 6 is a diagram for explaining processing by a calculation unit.

More specifically, as shown in FIG. 6, the calculation unit 15d optimizes a model for outputting a feature vector of distributed expression by phrases co-occurring in each user generation content of a set of user generation contents in advance. In the example shown in FIG. 6, the calculation unit 15d sets each of the word (1-gram phrase) and 2-gram phrase appearing in the set of malicious user generation content as each row, and uses the matrix (see 1.) with each column used as the input weight each user generation content (document). The calculation unit 15d calculates the average of each line corresponding to each phrase (see 2.).

Further, the calculation unit 15d calculates the inner product using each document as each row and the matrix with each word as each column as the output weight (see 3.), and optimizes the model that outputs the feature vector of the distributed expression of each phrase (see 4.)

Then, as shown in FIG. 7, the calculation unit 15d first extracts a word existing in the dictionary from the character string of the URL in the content for the set U of the collected user generation content, and replaces it with the character string of the URL. (WordSegmentation).

The calculation unit 15d optimizes the distributed expression model for the words (1-gram phrases) and 2-gram phrases that appear in the set U of user generation content in advance, as shown in FIG. 6. Then, the calculation unit 15*d* generates a set of feature vectors VEC*ᵤ* of each user generation content u, using an optimized distributed expression model (Word Embeddings). Then, the calculation unit 15*d* calculates the average of the feature vector VEC*ᵤ* of each user generation content u as the text feature amount of the set of user generation content.

Here, even in events at different timings, there is a tendency that many similar words exist in malicious user generation contents. Therefore, for the set U of malicious user generation content, the average of the feature vector VEC*ᵤ* of each user generation content u calculated as described above can be a feature amount that reflects the features of the set U of user generation content.

The calculation unit 15*d* calculates a group feature amount representing a feature related to similarity of words between a plurality of user generation contents generated in a predetermined period. Specifically, as shown in FIG. 8, the calculation unit 15*d* applies the Minhash-LSH algorithm to the appearing words (1-gram phrases) for the set U of user generation contents collected at the same time, and calculates the degree of similarity between the user generation contents. Here, the same time means that the time difference between the date and time generation is within a predetermined time threshold. When the calculated similarity exceeds a predetermined similarity threshold, the calculation unit 15*d* sets the set of user generation contents as a similar user generation content set.

A calculation unit 15*d* specifies a group feature amount for a similar user generation content set. The group feature amount is SIZE OF SET, the number of users in the set, the number of unique URLs described in the set, the average number of URLs described in the user generation content in the set, or the average posting time interval in the set.

For example, as shown in FIG. 9, a calculation unit 15*d* determines whether the user generation content set is a similar user generation content set for each collected user generation content set, and when the content is a similar user generation content set, a group feature amount is specified. FIG. 9 shows, for example, that the user generation content 1 is generated by user1 and the appearing word is "Free live streaming URL1 URL1". Also, it is shown that the user generation contents 1 to 3 are the same similar user generation contents set. Also, as the group feature amount of this similar user generation content set, the average posting time interval, the set size is 3, the number of unique users of the set is 2 (user1, user2), the number of unique URL of the set is 2 (URL1, URL2), and the average number of URLs of one content is 1.67.

Also, it is shown that the user generation contents 4 and 5 are the same similar user generation contents set. Also, it is shown that the user generation contents 6 and 7 are not similar user generation contents set.

The malicious user generation content tends to be spread at the same time in a similar context. Thus, the group feature amount can be identified as described above for a malicious user generation content set. That is, when the group feature amount can be specified in this way, it means that the set of user generation contents is highly likely to be malignant.

The description of FIG. 2 is now resumed. A learning unit 15*e* performs learning, using the calculated feature amount of the user generation content generated by the regular user and the feature amount of the content generated by the malicious user. The determination unit 15*f* determines whether the user generation content is generated by the malicious user by the learned model.

Specifically, the learning unit 15*e* performs supervised learning of the machine learning model, using a text feature amount representing co-occurrence of phrases of the user generation content and a group feature amount representing similarity of words appearing in each user generation content. The determination unit 15*f* determines whether the user generation content of the service acquired thereafter is malignant, using the learned machine learning model.

In this way, the determination function unit 15B can learn the features of the user generation contents which are generated at a specific timing such as an event and have a high possibility of being malignant, and determines the degree of malignancy of the user generation contents collected in real time, using the learning result.

Figure 10:
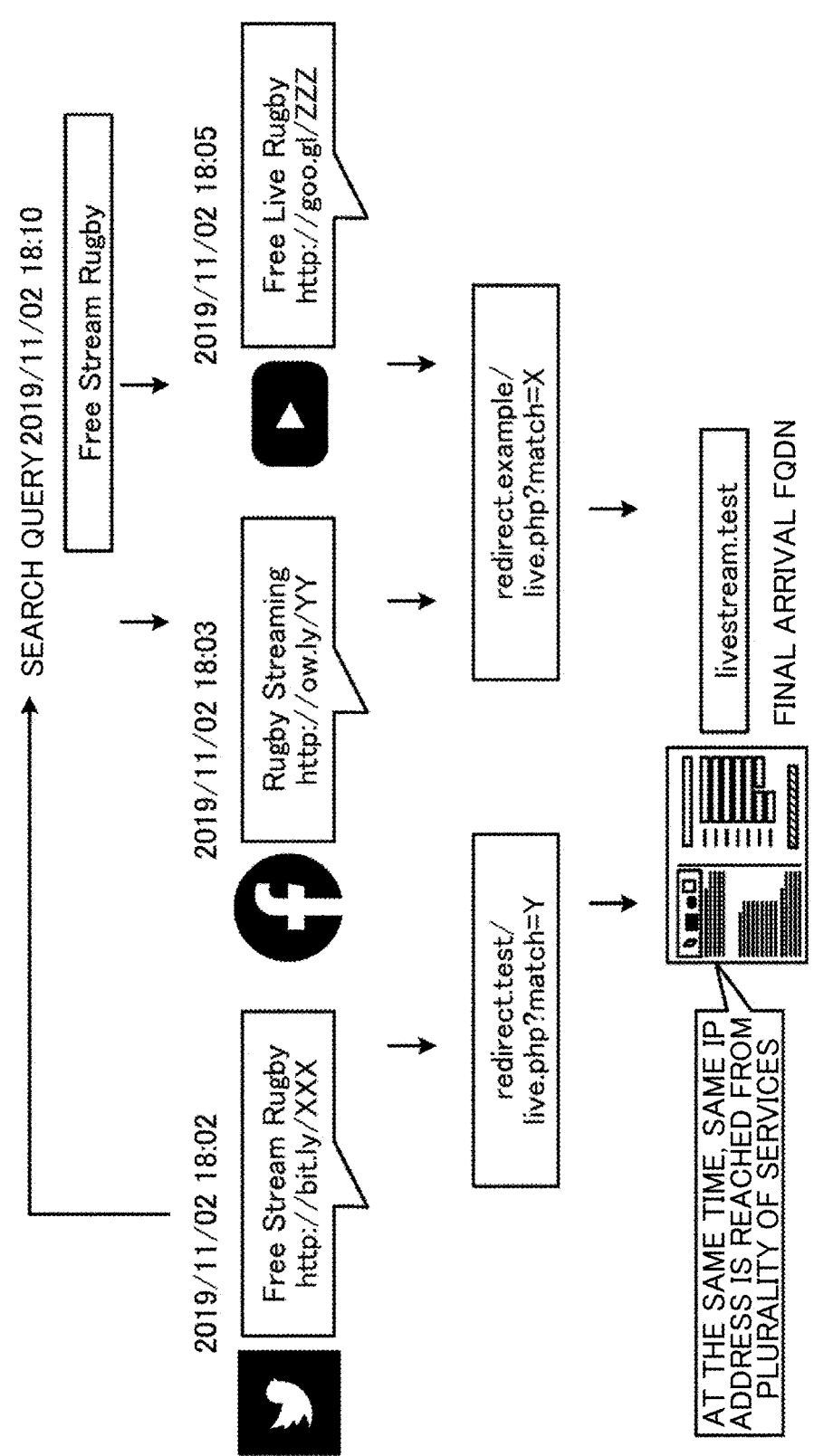
FIG. 10 is an explanatory drawing of processing of an extraction function unit.

[Extraction Function Unit] FIG. 10 is a diagram for explaining the processing of the extraction function unit. As shown in FIG. 10, the extraction function unit 15C extracts the feature amount of the Web content obtained by accessing the URL included in the user generation content in an arbitrary service. For example, the extraction function unit 15C specifies the IP address of the FQDN (completely designated domain name) which will be finally reached.

The extraction function unit 15C learns user generation contents generated by an attacker and user generation contents generated by a normal user, using the feature amount. Then, an extraction function unit 15C performs a determination of malignancy on the user generation contents generated in large amounts by an arbitrary service at the same time, using the learned feature amount.

When it is determined that the content is malicious user generation content, the extraction function unit 15C extracts threat information that is a feature that can be a threat from the malicious user generation content, and outputs a threat report. In this way, the extraction function unit 15C can detect an attack that may become a threat in real time.

The description of FIG. 2 is now resumed. An extraction unit 15*g* accesses an entrance URL described in user generation content generated by a user in a plurality of services in a predetermined period to extract a feature amount of the user generation content. The extracted feature amount includes a feature amount related to the Web content of the arriving Web site which arrives and a feature amount related to a plurality of user generation contents generated in a predetermined period.

Specifically, first, the extraction unit 15*g* accesses the entrance URL using the URL described in the collected user generation content as the entrance URL, and identifies the URL of the site finally reached, that is, the arrival URL. When the entrance URL is the one utilizing the URL shortening service, it is regarded as the entrance URL as it is.

The URL described in the user generation content includes ones that use URL shortening services such as com bit [.] Ly, tinyuri [.] com. The URL shortening service is a service for converting a long URL into a short and simple URL and issuing it. Most of the URL shortening services are redirected to the original long URL when access to the short URL is made by associating the long URL of the other site with the short URL issued under the control of the own service.

Then, the extraction unit 15*g* creates a Web crawler by combining, for example, the scraping framework Scrapy and the headless browser Splash capable of rendering Javascript (registered trademark). Thus, the extraction unit 15*g* accesses the URL described in the user generation content and records the communication information.

For example, the extraction unit 15g records the Web content of the Web site which finally reaches and the number of times of redirection. When the communication pattern transitions in the order of the entrance URL "bit.ly/aaa"→"redirect.com/"→the arrival URL "malicious.com", the number of redirections twice, Web contents of the final arrival website "malicious.com" and the like are recorded.

Then, the extraction unit 15g extracts the feature amount of Web contents, such as the number of tags of each HTML of the arrival site, the distributed expression of the character string displayed on the arrival site, the number of redirects, the number of FQDN (fully specified domain name) transitioning from the entrance URL to the arrival URL, and the like. Here, the tag to be added by the HTML is, for example, a tag of a TOP 30 frequently appearing in a malignant site, and the extraction unit 15g can extract the feature amount of malicious user generation content.

The extraction unit 15g specifies the IP address of the FQDN which finally reaches. When the same IP address is reached from a plurality of services at the same time, the extraction unit 15g sets the set of the user generation contents as a similar user generation content set.

Then, the extraction unit 15g extracts, for the similar user generation content set, feature amounts of user generation contents, such as the number of user generation contents in the set, the number of services, the number of entrance URLs, the number of users, and the distributed expression of text.

The learning unit 15e performs learning, using the extracted feature amount of the user generation content generated by the normal user and the feature amount of the content generated by the malicious user. The determination unit 15f determines whether the user generation content is generated by the malicious user by the learned model.

Specifically, the learning unit 15e performs supervised learning of the machine learning model, using the extracted feature amount related to the Web content of the final arrival Web site and the feature amount related to the user generation content generated at the same time. The determination unit 15f determines whether the user generation content of the service acquired thereafter is malignant, using the learned machine learning model.

In this way, the learning unit 15e learns features of a user generation content set which is generated in a similar context at a specific timing such as an event and has a high possibility of being malignant and in which URLs reaching the same IP address are described. Therefore, the determination unit 15f can determine the degree of malignancy of the user generation content collected in real time, using the learning result.

Figure 12:
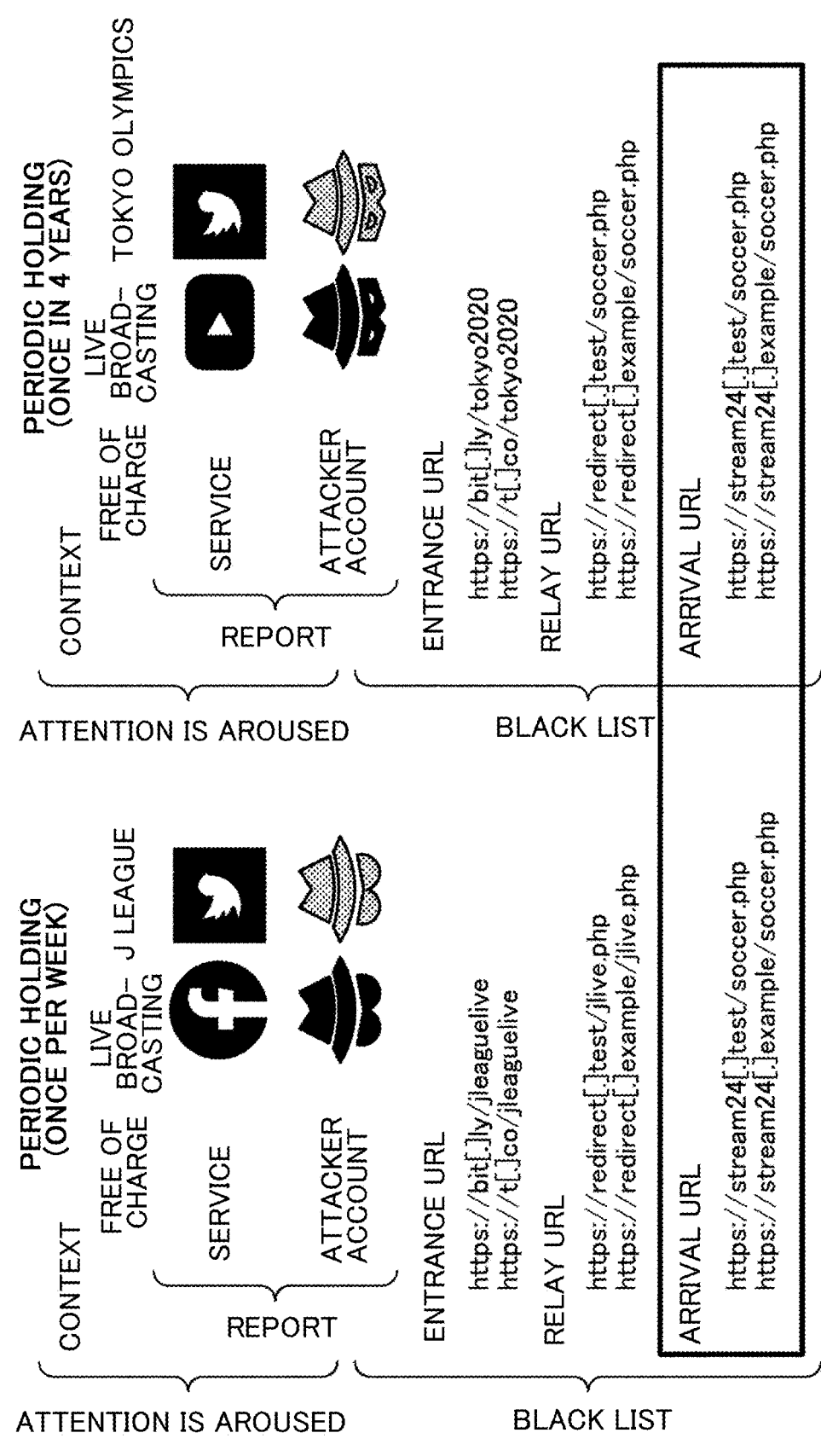
FIG. 12 is a diagram for explaining threat information.

When it is determined that the user generation content is generated by the malicious user, the extraction unit 15g outputs the feature of the attack of the user generation content as threat information. FIGS. 11 and 12 are diagrams for explaining threat information. As shown in FIG. 11, the threat information includes, for example, a key phrase included in the user generation content, an entrance URL and an arrival URL described in the user generation content of each service or the like. In the example shown in FIG. 11, the user generation contents of the service a and the service b including the key phrase "rugby world cup", the entrance URL described in each of the service a and the service b, and the arrival URL common to the service a and the service b are shown. The extraction unit 15g outputs the threat information to a predetermined providing destination via an output unit 12 or a communication control unit 13.

Specifically, as shown in FIG. 12, attention calling such as notification to a providing destination, and a black list are provided as threat information. In the example shown in FIG. 12, attention is drawn to user generation content in the context including, for example, the words "regular holding (once a week), free, live broadcasting, J League" and the like. In particular, an account of an attacker using this context and an abused service are reported. A blacklist including an entrance URL described in the user generation content, a relay URL transited from the entrance URL, and an arrival URL finally reaching from the relay URL is presented.

The example shown in FIG. 12 shows that the arrival URL is a common malicious site, about the malignant user generation content in the above context and the malignant user generation content in the context including the word "regular holding (once every four years), free, live broadcast, Tokyo Olympics", etc.

In this way, the extraction function unit 15C determines the degree of malignancy of the user generation contents generated in large amounts by an arbitrary service at the same time and having high possibility of the degree of malignancy, using the feature amount obtained by accessing the entrance URL. When it is determined that the content is malicious user generation content, the extraction function unit 15C extracts threat information from the malicious user generation content and outputs a threat report. Thus, the extraction function unit 15C can detect an attack which may become a threat in real time among user generation contents which are generated in large amounts by an arbitrary service at the same time and have high possibility of being malignant, and output attack information.

When the determination function unit 15B determines that the content is a malicious user generation content, the extraction unit 15g may output features of an attack such as a character string and a URL included in the guidance context of the user generation content as threat information.

Figure 13:
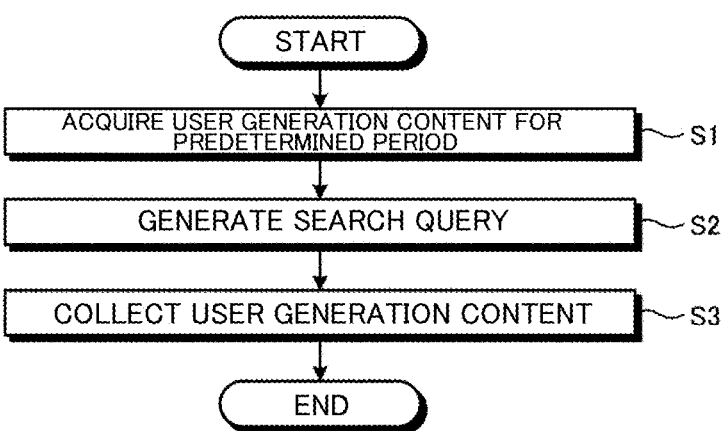
FIG. 13 is a flowchart showing a processing procedure of the collection function unit.

[Detection Processing] Next, detection processing of the detection device 1 according to the present embodiment will be described with reference to FIGS. 13 to 17. FIG. 13 is a flowchart showing a collection processing procedure of the collection function unit. The flowchart of FIG. 13 is started, for example, at the timing when the user inputs an operation instructing the start.

First, the acquisition unit 15a acquires user generation contents generated in each service in a predetermined period (step S1). Specifically, the acquisition unit 15a acquires user generation contents from a server or the like of each service via the input unit 11 or the communication control unit 13.

Next, the generation unit 15b generates a retrieval query, using words appearing in the user generation contents for each service. For example, the generation unit 15b generates a search query, using a combination of appearing words (step S2).

The generation unit 15b calculates the degree of malignancy of the retrieval query for each service, and selects the retrieval query whose calculated malignancy is equal to or more than a threshold as the retrieval query of the user generation content which may become the degree of malignancy of the service.

The collection unit 15c collects user generation contents generated in a predetermined service, using the selected retrieval query (step S3). In this way, a series of collection processes ends.

Figure 14:
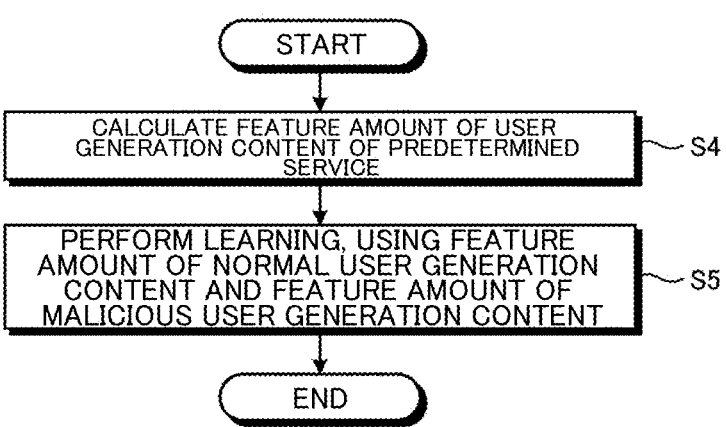
FIG. 14 is a flowchart showing a processing procedure of the determination function unit.
Figure 15:
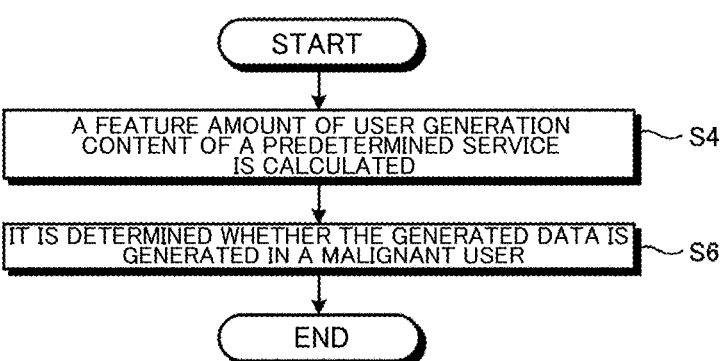
FIG. 15 is a flowchart showing a processing procedure of the determination function unit.

Next, FIGS. 14 and 15 are flowcharts showing the processing procedure of the determination function unit. First, the flowchart of FIG. 14 shows the learning process in the determination function unit 15B, and is started at the timing when, for example, the user inputs an operation instructing the start.

The calculation unit 15d calculates the feature amount of the user generation content of the predetermined service collected by the collection function unit 15A in a predetermined period (step S4). Specifically, the calculation unit 15d calculates a text feature amount representing a feature of a combination of words co-occurring in a plurality of user generation contents, and a group feature amount representing a feature related to similarity of words between the plurality of user generation contents generated in a predetermined period.

Also, the learning unit 15e performs learning, using the calculated feature amount of the user generation content generated by the normal user and the feature amount of the content generated by the malicious user (step S5). With this, a series of the learning processing is ended.

Next, the flowchart of FIG. 15 shows the determination process in the determination function unit 15B, and is started at the timing when, for example, the user inputs an operation instructing the start.

The calculation unit 15d calculates the feature amount of the user generation content of the predetermined service collected by the collection function unit 15A in a predetermined period (step S4).

Next, the determination unit 15f determines whether the user generation content is generated by a malicious user by the learned model (step S6). Accordingly, the series of learning processing are ended.

Figure 16:
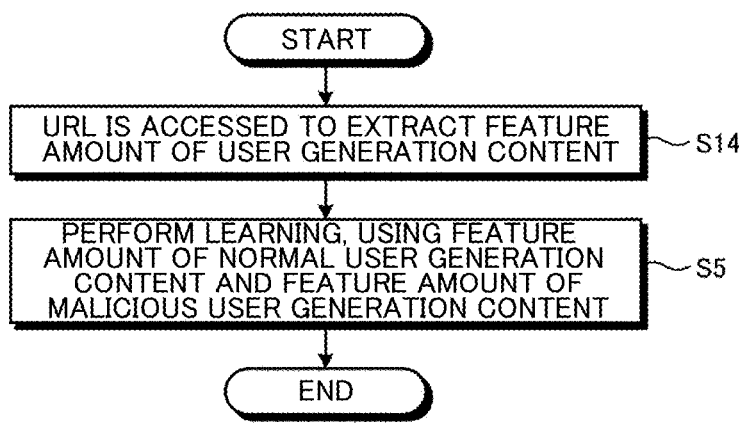
FIG. 16 is a flowchart which shows processing procedure of an extraction function unit.
Figure 17:
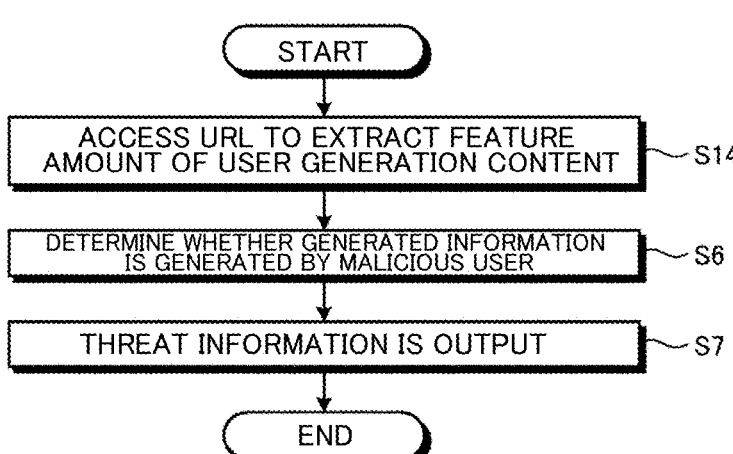
FIG. 17 is a flowchart showing the processing procedure of the extraction function unit.

FIGS. 16 and 17 are flowcharts showing the processing procedure of the extraction function unit. First, the flowchart of FIG. 16 shows the learning process in the extraction function unit 15C, and is started at the timing when, for example, the user inputs an operation instructing the start.

First, the extraction unit 15g accesses an entrance URL described in user generation contents of a plurality of services collected by the collection function unit 15A in a predetermined period, and extracts a feature amount of the user generation contents (step S14). Specifically, the extraction unit 15g extracts a feature amount related to the Web content of the arriving Web site which arrives and a feature amount related to a plurality of user generation contents generated in a predetermined period.

Also, the learning unit 15e performs learning, using the extracted feature amount of the user generation content generated by the normal user and the feature amount of the content generated by the malicious user (step S5). With this, a series of the learning processing is ended.

Next, the flowchart of FIG. 17 shows the determination process in the extraction function unit 15C, and is started at the timing when, for example, the user inputs an operation instructing the start.

First, the extraction unit 15g accesses an entrance URL described in user generation contents of a plurality of services collected by the collection function unit 15A in a predetermined period, and extracts a feature amount of the user generation contents (step S14).

Also, the determination unit 15f determines whether the user generation content is generated by a malicious user by the learned model (step S6).

Then, when the determination unit 15f determines that the user generation content is generated by the malicious user, the extraction unit 15g outputs the feature of the attack of the user generation content as threat information (step S7). Accordingly, the series of learning processing are ended.

In the same way as the process of FIG. 17, the process of step S7 may be performed after the process of step S6 shown in FIG. 15. That is, when the determination function unit 15B determines that the user generation content is generated by the malicious user, the extraction unit 15g may output the feature of the attack of the user generation content as threat information.

As described above, in the collection function unit 15A of the present embodiment, the acquisition unit 15a acquires the user generation content generated in each service in a predetermined period. The generation unit 15b generates a retrieval query, using words appearing in user generation contents for each service. The collection unit 15c collects user generation contents generated in the plurality of services, using the generated retrieval query.

Thus, the collection function unit 15A can efficiently collect user generation contents which are spread in a similar context at a specific timing and have high possibility of being malignant. As a result, the detection device 1 can quickly and accurately detect a malignant site in a wide range.

The generation unit 15b selects a retrieval query which may become malignant for each service. Thus, the collection function unit 15A can easily and quickly collect user generation contents having a high possibility of being malignant for each service.

In the determination function unit 15B, the calculation unit 15d calculates the feature amount of user generation contents generated by the user in a predetermined period. The learning unit 15e performs learning, using the calculated feature amount of the user generation content generated by the regular user and the feature amount of the content generated by the malicious user. The determination unit 15f determines whether the user generation content is generated by the malicious user by the learned model.

Thus, the determination function unit 15B can learn the features of the user generation contents generated at a specific timing such as an event, and determines the degree of malignancy of the user generation contents collected in real time, using the learning result. Thus, the determination function unit 15B can quickly and accurately detect the malignant site.

The feature amount of the user generation content calculated by the calculation unit 15d includes a text feature amount representing the feature of a combination of words co-occurring in the plurality of user generation contents, and a group feature amount representing the feature related to the similarity of words between the plurality of user generation contents generated in a predetermined period.

Thus, the determination function unit 15B performs learning, using the features of the user generation contents having high possibility of being malignant, and performs the determination of the degree of malignancy of the user generation contents collected in real time, using the learning result.

In the extraction function unit 15C, the extraction unit 15g accesses the entrance URL described in the user generation content generated by the user in a plurality of services in a predetermined period, and extracts the feature amount of the user generation content. The learning unit 15e performs learning, using the extracted feature amount of the user generation content generated by the normal user and the feature amount of the content generated by the malicious user. The determination unit 15f determines whether the user generation content is generated by the malicious user by the learned model.

Thus, the extraction function unit 15C can determine the degree of malignancy of the user generation contents collected in real time, using the features of the user generation contents of various services generated at a specific timing such as an event. Thus, the extraction function unit 15C can quickly and accurately detect the malignant site in a wide range.

The feature amount extracted by the extraction unit 15g includes a feature amount related to the Web content of the arriving Web site which arrives, and a feature amount related to a plurality of user generation contents generated in a predetermined period. Thus, the extraction function unit 15C can extract threat information of an effective malignant site.

When it is determined that the user generation content is generated by the malicious user, the extraction unit 15g outputs the feature of the attack of the user generation content as threat information. Thus, the extraction function unit 15C can present the threat information of the effective malignant site to a predetermined providing destination.

In the detection device 1 of the present embodiment, the acquisition unit 15a acquires user generation contents generated in each service in a predetermined period. The generation unit 15b generates a retrieval query, using words appearing in user generation contents for each service. The collection unit 15c collects user generation contents generated in the plurality of services, using the generated retrieval query. The calculation unit 15d calculates the feature amount of the user generation content of the collected predetermined service. The learning unit 15e performs learning, using the feature amount of the user generation content generated by the regular user and the feature amount of the content generated by the malicious user. The determination unit 15f determines whether the user generation content is generated by the malicious user by the learned model. When it is determined that the user generation content is generated by the malicious user, an extraction unit 15g accesses an entrance URL described in the user generation content and outputs the feature of the attack of the user generation content as threat information.

Thus, the detection device 1 can quickly detect malicious user generation content, using the features of user generation content generated at a specific timing such as an event, and can present threat information of effective malicious site to a predetermined providing destination. Thus, the detection device 1 can quickly detect a malignant site in a wide range.

The generation unit 15b selects a retrieval query which may become malignant for each service. Thus, the detection device 1 can easily collect user generation contents having high possibility of being malignant and detect the malignant user generation contents more quickly.

The feature amount of the user generation content calculated by the calculation unit 15d includes a text feature amount representing the feature of a combination of words co-occurring in the plurality of user generation contents, and a group feature amount representing the feature related to the similarity of words between the plurality of user generation contents generated in a predetermined period. Thus, the detection device 1 can more quickly detect malicious user generation content with the user generation content having high possibility of being malicious as a processing object.

The learning unit 15e performs learning using the feature amounts of the user generation contents of the plurality of services extracted by the extraction unit 15g, and the determination unit 15f determines whether the user generation contents of the plurality of services are generated by the malicious user, by the learned model. Thus, the malicious user generation content can be detected more quickly, using the feature of the user generation content of an arbitrary service.

The feature amount extracted by the extraction unit 15g includes a feature amount related to the Web content of the arriving Web site which arrives and a feature amount related to a plurality of user generation contents generated in a predetermined period. Thus, the detection device 1 can present threat information of an effective malignant site to a predetermined providing destination.

[Program] It is also possible to create a program in which the processing executed by the detection device 1 according to the above embodiment is described in a language executable by a computer. As one embodiment, the detection device 1 can be implemented by installing a detection program for executing the detection processing as package software or online software in a desired computer. For example, by causing the information processing device to execute the detection program, the information processing device can be made to function as the detection device 1. The information processing device includes a desktop type or laptop type personal computer. In addition, information processing devices include mobile communication terminals such as smartphones, mobile phones and Personal Handy-phone System (PHS) and slate terminals such as Personal Digital Assistants (PDAs). Furthermore, the functions of the detection device 1 may be implemented in a cloud server.

Figure 18:
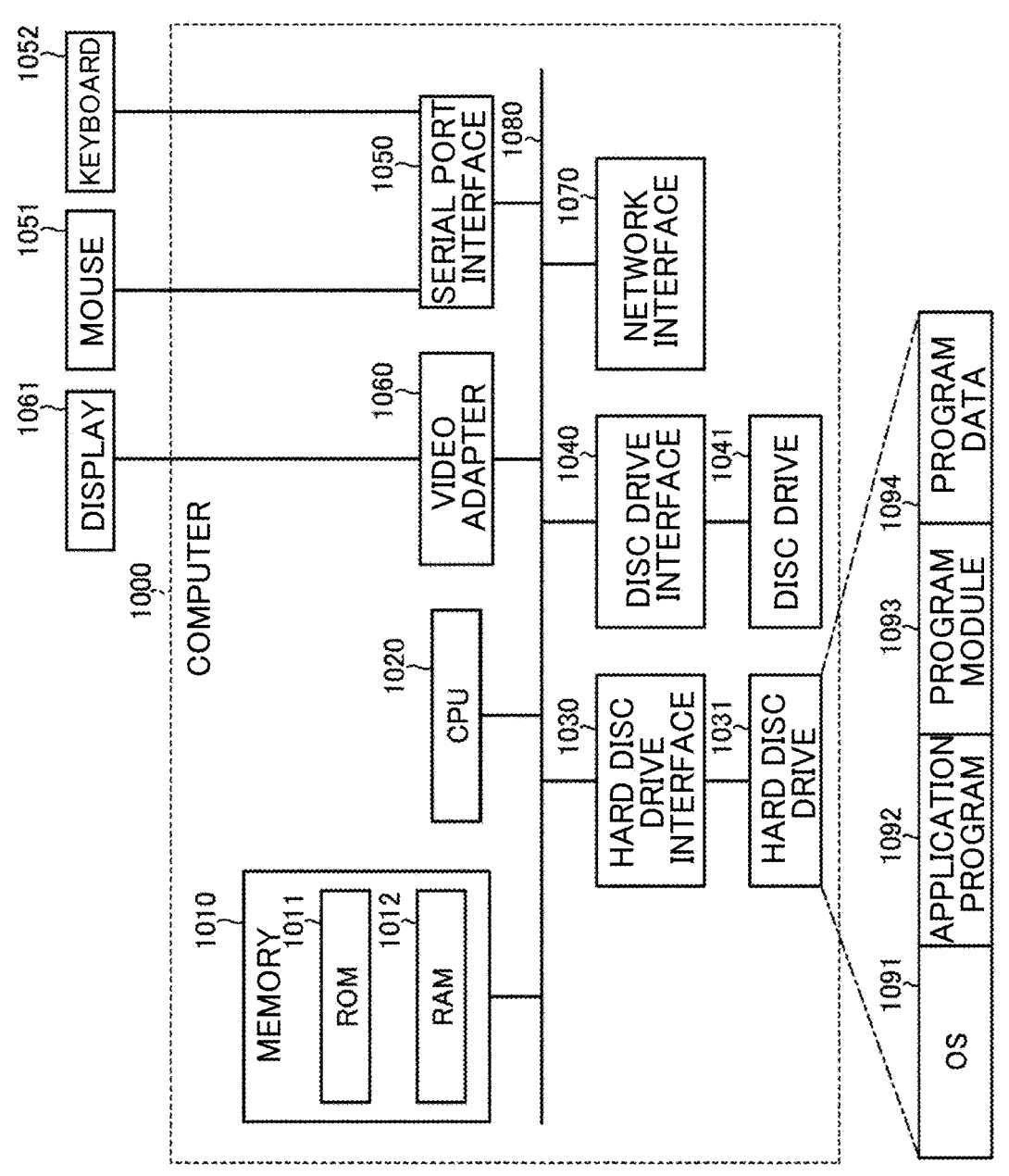
FIG. 18 is a diagram showing an example of a computer that executes a detection program.

FIG. 18 is a diagram showing an example of a computer that executes the detection program. A computer 1000 has a memory 1010, a CPU 1020, a hard disc drive interface 1030, a disc drive interface 1040, a serial port interface 1050, a video adapter 1060, and a network interface 1070, for example. These units are connected by a bus 1080.

The memory 1010 includes a read only memory (ROM) 1011 and a RAM 1012. The ROM 1011 stores, for example, a boot program such as a Basic Input Output System (BIOS). The hard disc drive interface 1030 is connected to the hard disc drive 1031. The disc drive interface 1040 is connected to a disc drive 1041. A detachable storage medium such as a magnetic disc or an optical disc, for example, is inserted into the disc drive 1041. A mouse 1051 and a keyboard 1052, for example, are connected to the serial port interface 1050. A display 1061, for example, is connected to the video adapter 1060.

Here, the hard disc drive 1031 stores, for example, an OS 1091, an application program 1092, a program module 1093, and program data 1094. Each of the pieces of information described in the above embodiment is stored in, for example, the hard disc drive 1031 or the memory 1010.

The detection program is stored in the hard disc drive 1031 as the program module 1093 in which commands executed by the computer 1000 are described, for example. Specifically, the program module 1093 in which respective processes executed by the detection device 1 described in the embodiment are described is stored in the hard disc drive 1031.

The data used for information processing by the detection program is stored in the hard disc drive 1031, for example, as the program data 1094. Thereafter, the CPU 1020 reads out and loads the program module 1093 and the program data 1094 stored in the hard disc drive 1031 to the RAM 1012 when necessary, and executes each of the above-described procedures.

Note that the program module 1093 and program data 1094 related to the detection program are not limited to being stored in the hard disc drive 1031, and may also be stored in, for example, a removable storage medium and read out by the CPU 1020 via the disc drive 1041, etc. Alternatively, the program module 1093 and the program data 1094 related to the detection program may be stored in another computer connected via a network such as a LAN or Wide Area Network (WAN), and may be read by the CPU 1020 via the network interface 1070.

Although the embodiment to which the invention made by the present inventor has been applied has been described above, the present invention is not limited by the description and the drawings that form a part of the disclosure of the present invention according to the present embodiment. That is, other embodiments, examples, operational techniques, and the like made by those skilled in the art or the like on the basis of the present embodiment are all included in the category of the present invention.

REFERENCE SIGNS LIST

1 Detection device
11 Input unit
12 Output unit
13 Communication control unit
14 Storage unit
15 Controller
15A Collection function unit
15B Determination function unit
15C Extraction function unit
15*a* Acquisition unit
15*b* Generation unit
15*c* Collection unit
15*d* Calculation unit
15*e* Learning unit
15*f* Determination unit
15*g* Extraction function unit

The invention claimed is:
1. A detection device, comprising:
processing circuitry configured to:
    obtain user generated texts generated in an online service in a predetermined period;
    extract a key phrase from the user generated texts, wherein the key phrase is a phrase representing a similar context that the user generated texts have;
    generate a search query using words appearing in the key phrase;
    calculate a degree of malignancy of the generated search query;
    determine whether the degree of malignancy satisfies a threshold;
    in response to a determination that the degree of malignancy satisfies the threshold, select the generated search query as a query for searching user generated texts generated by a malicious user;
    collect, using the selected search query, user generated texts generated by the malicious user in another online service;
    calculate features of the user generated texts generated by the malicious user;
    calculate features of user generated texts generated by normal users in the other online service;
    train a model using (i) the features of the user generated texts generated by the normal users and (ii) the features of the user generated texts generated by the malicious user;
    determine whether a particular user generated text is generated by the malicious user based on the trained model; and in response to a determination that the particular user generated text is generated by the malicious user:
        access an entrance URL described in the particular user generated text; and
        output a feature of an attack of the particular user generated text as threat information.
2. The detection device according to claim 1, wherein the processing circuitry is further configured to select a search query that may become malicious for each service.
3. The detection device according to claim 1, wherein the features of the user generated texts generated by the malicious user and the features of the user generated texts generated by the normal users include:
    a text feature representing a combination of words co-occurring in a plurality of pieces of user generated content, and
    a group feature related to similarity of words between the plurality of pieces of user generated content generated in a predetermined period.
4. The detection device according to claim 1, wherein the features of the user generated texts generated by the malicious user and the features of the user generated texts generated by the normal users include:
    a feature related to Web content of an arrival web site at which a user will arrive, and
    features related to a plurality of pieces of user generated content generated in a predetermined period.
5. A detection method which is executed by a detection device, the detection method comprising:
    obtaining user generated texts generated in an online service in a predetermined period;
    extracting a key phrase from the user generated texts, wherein the key phrase is a phrase representing a similar context that the user generated texts have;
    generating a search query using words appearing in the key phrase;
    calculating a degree of malignancy of the generated search query;
    determining whether the degree of malignancy satisfies a threshold;
    in response to a determination that the degree of malignancy satisfies the threshold, selecting the generated search query as a query for searching user generated texts generated by a malicious user;
    collecting, using the selected search query, user generated texts generated by the malicious user in another online service;
    calculating features of the user generated texts generated by the malicious user;
    calculating features of user generated texts generated by normal users in the other online service;
    training a model using (i) the features of the user generated texts generated by the normal users and (ii) the features of the user generated texts generated by the malicious user;
    determining whether a particular user generated text is generated by the malicious user based on the trained model; and
    in response to a determination that the particular user generated text is generated by the malicious user:
        accessing an entrance URL described in the particular user generated text; and
        outputting a feature of an attack of the particular user generated text as threat information.
6. A non-transitory computer-readable recording medium storing therein a detection program that causes a computer to execute a process comprising:

obtaining user generated texts generated in an online service in a predetermined period;

extracting a key phrase from the user generated texts, wherein the key phrase is a phrase representing a similar context that the user generated texts have;

generating a search query using words appearing in the key phrase;

calculating a degree of malignancy of the generated search query;

determining whether the degree of malignancy satisfies a threshold;

in response to a determination that the degree of malignancy satisfies the threshold, selecting the generated search query as a query for searching user generated texts generated by a malicious user;

collecting, using the selected search query, user generated texts generated by the malicious user in another online service;

calculating features of the user generated texts generated by the malicious user;

calculating features of user generated texts generated by normal users in the other online service;

training a model using (i) the features of the user generated texts generated by the normal users and (ii) the features of the user generated texts generated by the malicious user;

determining whether a particular user generated text is generated by the malicious user based on the trained model; and in response to a determination that the particular user generated text is generated by the malicious user:

accessing an entrance URL described in the particular user generated text; and outputting a feature of an attack of the particular user generated text as threat information.

* * * * *